United States Patent
Braun et al.

(10) Patent No.: US 6,296,394 B1
(45) Date of Patent: *Oct. 2, 2001

(54) CENTER BEARING FOR A SHAFT

(75) Inventors: Jürgen Braun, Remseck; Dieter Kandert, Wiernsheim; Dittmar Wieland, Oppenweiler, all of (DE)

(73) Assignee: DaimlerChrysler AG, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/209,729

(22) Filed: Dec. 11, 1998

(30) Foreign Application Priority Data

Dec. 13, 1997 (DE) ................................ 197 55 563

(51) Int. Cl.[7] .................................................... F16C 43/00
(52) U.S. Cl. ................................... 384/535; 440/83
(58) Field of Search ........................... 384/535, 536, 384/581, 582, 126, 495, 49, 477, 558, 141

(56) References Cited

U.S. PATENT DOCUMENTS

| | | | | |
|---|---|---|---|---|
| Re. 36,270 | * | 8/1999 | Duggan | 384/535 X |
| 2,081,237 | | 5/1937 | Jantsch . | |
| 2,165,155 | * | 7/1939 | Schmal | 384/536 |
| 2,893,790 | | 7/1959 | Raes et al. . | |
| 2,897,023 | * | 7/1959 | Burkhalter et al. | 384/536 |
| 3,639,015 | * | 2/1972 | Mass | 384/536 |
| 3,961,829 | * | 6/1976 | Bowen et al. | 384/536 |
| 4,054,336 | * | 10/1977 | Ernst et al. | 384/130 |
| 4,282,770 | * | 8/1981 | Adams | 74/498 |
| 4,403,812 | * | 9/1983 | Stephan | 381/536 |
| 4,713,977 | * | 12/1987 | Koster et al. | 475/166 |
| 4,722,618 | * | 2/1988 | Matsumoto et al. | 384/536 |
| 4,848,938 | * | 7/1989 | Haas et al. | 384/536 X |
| 5,161,903 | * | 11/1992 | March | 384/536 |
| 5,205,384 | * | 4/1993 | Heshmat | 384/535 X |
| 5,314,255 | * | 5/1994 | Schwerdt | 384/536 |
| 5,366,396 | * | 11/1994 | Schulze | 440/83 X |
| 5,492,418 | * | 2/1996 | Brossard | 384/536 |
| 5,558,456 | * | 9/1996 | Nakase et al. | 440/83 |

FOREIGN PATENT DOCUMENTS

| | | | |
|---|---|---|---|
| 24 57 941 | 7/1975 | (DE) . | |
| 26 29 393 | 1/1977 | (DE) . | |
| 6 81 00 895 | 7/1981 | (DE) . | |
| 83 09 873 | 9/1983 | (DE) . | |
| 3319618 | * 12/1984 | (DE) | 384/551 |
| 3613123 | * 10/1987 | (DE) | 180/312 |
| 493474 | 10/1938 | (GB) . | |
| 526560 | 9/1940 | (GB) . | |
| 2136092 | * 9/1984 | (GB) | 384/551 |

* cited by examiner

Primary Examiner—David A. Bucci
Assistant Examiner—Colby Hansen
(74) Attorney, Agent, or Firm—Kenyon & Kenyon

(57) ABSTRACT

A center bearing for a shaft, in particular a propeller shaft, has a rolling bearing arranged on the propeller shaft and a bearing housing surrounding the center bearing. A slide ring in which the rolling bearing is axially displaceable is arranged over the outer periphery of the rolling bearing. A decoupling element is arranged between the slide ring and the bearing housing.

9 Claims, 1 Drawing Sheet

US 6,296,394 B1

CENTER BEARING FOR A SHAFT

FIELD OF THE INVENTION

The present invention relates to a center bearing for a shaft, and more particularly to a center bearing for a propeller shaft.

RELATED TECHNOLOGY

A center bearing is disclosed in U.S. Pat. No. 2,893,790. A disadvantage of this center bearing, however, is that an axial motion of the shaft can be absorbed in only very limited fashion. The physical design of the bearing does not provide for the absorption of greater axial forces or displacements.

German Patent Publication No. 26 29 393 A1 describes another center bearing. Although greater axial motions can be absorbed within this rolling bearing than with the bearing disclosed in U.S. Pat. No. 2,893,790, such motions nevertheless are limited because of the arrangement of the sealing elements. Another disadvantage with this center bearing is the use of cylindrical roller bearings, since this bearing configuration cannot be loaded when the shaft is at a standstill, and the presence of a load leads to chatter marks on the bearing guiding surfaces. With this center bearing, moreover, it is extremely difficult or impossible for design reasons to use a bearing configuration other than cylindrical roller bearings.

A further center bearing is disclosed in German Patent Publication No. 24 57 941. In this, a toothed toroidal ring is arranged between an inner element surrounding the rolling bearing and an outer element surrounding the inner element. The ring is said to be able, by rolling on the inner and outer elements, to absorb axial as well as tilting and radial forces.

Compensation for axial and tilting forces by rolling of the toothed and thus positively engaged toroidal ring is disadvantageous, however, since a dependency between the radial and axial stiffness of the entire shaft bearing results. For example, if a change occurs in the axial stiffness of the shaft bearing—resulting from a modification, for example, of the material, the size, or the tooth pattern of the toroidal ring—then the radial stiffness or tilting stiffness is automatically also influenced.

In addition, the shaft bearing described therein presents a resistance to any tilting force which occurs; this is in fact not desirable, however, since this tilting motion is in any case compensated for by the propeller shaft or cardan shaft.

German Patent Utility Model No. 81 00 855 describes a bearing arrangement for elastic bracing of a rotating shaft, in which an annular element manufactured from a resilient material is attached directly onto the outer ring of the rolling bearing.

The configuration depicted there also, however, has the disadvantage already described above, of dependency between radial and axial stiffness.

German Patent No. 83 09 873 D1 discloses a rod end bearing sealed with a sealing sleeve.

SUMMARY OF THE INVENTION

An object of the present invention to create a center bearing for a propeller shaft with which very large axial motions of the shaft can be absorbed.

The present invention provides a center bearing for a shaft, in particular a propeller shaft, comprising a rolling bearing arranged on the propeller shaft and comprising a bearing housing surrounding the center bearing. A slide ring (3) in which the rolling bearing (2) is axially displaceable is arranged over the outer periphery of the rolling bearing (2); and a decoupling element (4) is arranged between the slide ring (3) and the bearing housing (5). A dust protection bellows (7) is arranged around the rolling bearing (2) and the slide ring (3)

As a result of the fact that the rolling bearing can absorb forces in the axial direction because it is axially displaceable on the slide ring, axial forces are no longer passed on to the decoupling element. The decoupling element therefore needs to absorb only tilting motions, and can advantageously be physically designed very precisely for a specific radial stiffness, without thereby influencing the axial stiffness of the entire center bearing.

Axial displacement of the shaft is absorbed by a sliding motion of the rolling bearing on the slide ring. Because of this sliding motion, the axial stiffness of the center bearing is very low, so that even very small forces occurring during operation are no longer passed on to the shaft. The axial displacement travel of the rolling bearing on the slide ring can be of any desired magnitude.

This axial displacement travel is ensured by the arrangement, according to the present invention, of the dust protection ring between the roller bearing and the slide ring, since the latter participates in the axial motion of the rolling bearing with respect to the slide ring.

BRIEF DESCRIPTION OF THE DRAWINGS

Advantageous embodiments and developments of the present invention are evident from the dependent claims and from the exemplary embodiment described below in principle with reference to the drawing, in which:

DETAILED DESCRIPTION

Figure 1:
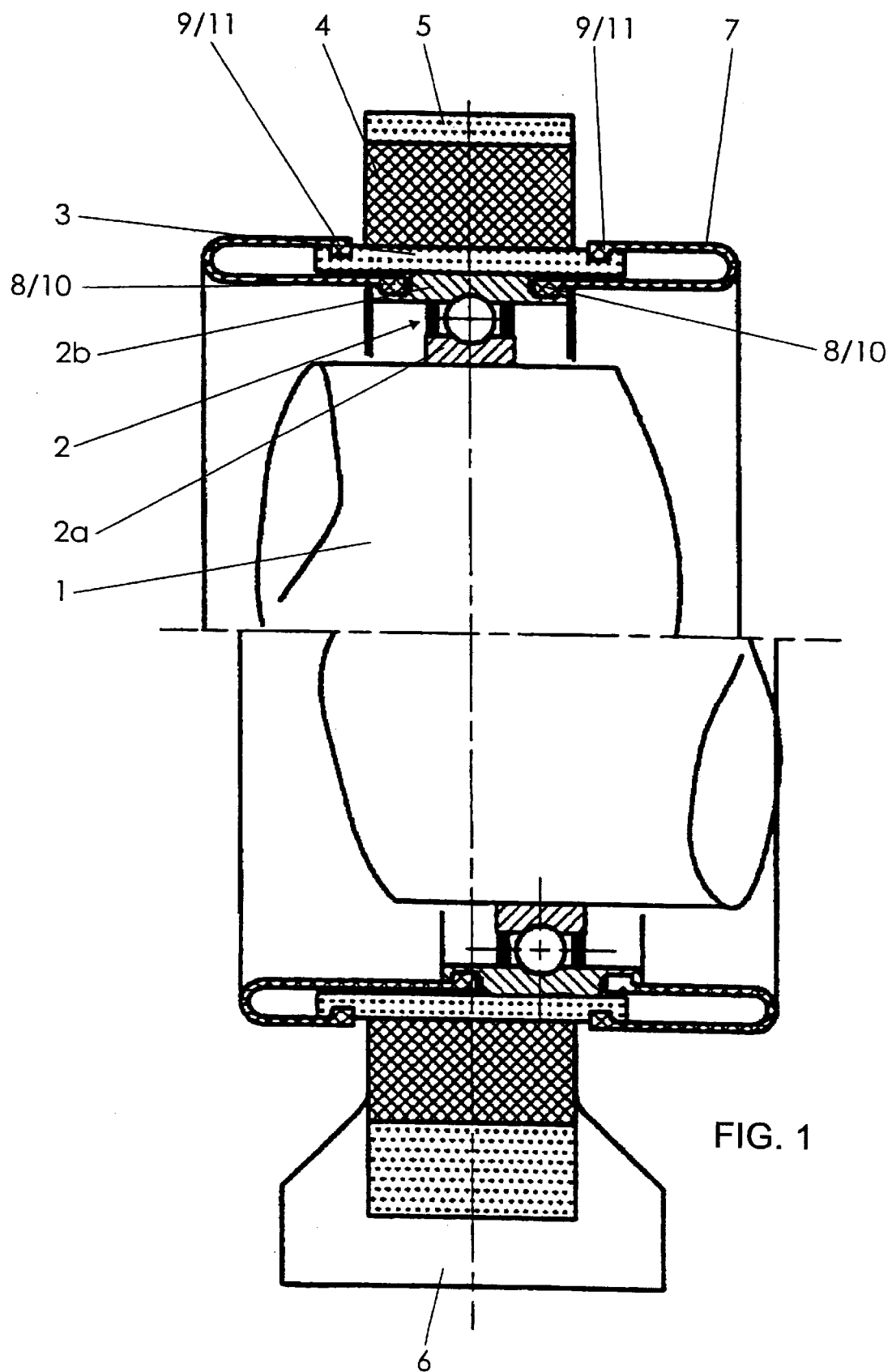
FIG. 1 shows a section through a center bearing according to the present invention for a propeller shaft.

According to the exemplary embodiment shown in FIG. 1, a rolling bearing 2, having an inner ring 2a and an outer ring 2b which is wider than inner ring 2a, is attached in known manner onto a propeller shaft 1 which is depicted only partially. Inner ring 2a is secured with a press fit onto propeller shaft 1. Propeller shaft 1 can be arranged, for example, in the floor region of a motor vehicle (not depicted).

Rolling bearing 2 is configured in this context as a thin-ring bearing, resulting in a very small and thin shape for rolling bearing 2. It is thereby possible to keep the mass of propeller shaft 1 relatively low.

A slide ring 3, along which roller bearing 2 can slide in the axial direction, is mounted around the periphery of outer ring 2b of rolling bearing 2. Slide ring 3 is wider in the axial direction than outer ring 2b. The forces occurring in the axial direction of propeller shaft 1 during operation can thus be absorbed by the axial displacement of rolling bearing 2 in slide ring 3. The relative position of inner ring 2a with respect to propeller shaft 1, however, is maintained. In the lower half of FIG. 1, rolling bearing 2 is shown displaced axially with respect to slide ring 3.

Slide ring 3 may preferably be made from plastic, and is surrounded by an elastically configured and thus resilient decoupling element 4. Decoupling element 4 is immovably joined to slide ring 3 and to a bearing housing 5 surrounding decoupling element 4. An immovable connection between slide ring 3 and bearing housing 5 is thus created via decoupling element 4. Bearing housing 5 is joined via a mounting device 6 to the body (not depicted) of the motor vehicle.

Tilting motions occurring in propeller shaft 1, for example due to vibrations of the internal combustion engine (also not depicted), can be elastically absorbed by a deformation of decoupling element 4, which is made of elastomeric material. Decoupling element 4 also results in damping of noise that is created by propeller shaft 1 or rolling bearing 2 or introduced via bearing housing 5.

In this case, the spring characteristic curve of decoupling element 4 in the radial direction is less than 60 N/mm, so that the resistance to any tilting of propeller shaft 1 is very low. In order to influence the stiffness of decoupling element 4 and thus also its noise damping, various materials with, for example, different hardnesses can be used, or decoupling element 4 can be constructed from different radial layers, or it can be equipped with recesses or changes in cross section in the circumferential direction. The radial stiffness or resilience of decoupling element 4 is, however, the same in every axial position of rolling bearing 2 on slide ring 3.

The arrangement of slide ring 3 and of decoupling element 4 thus causes the radial and axial forces occurring during operation of propeller shaft 1 to be decoupled from one another. These forces can thus be adapted, independently of one another, to the particular conditions on propeller shaft 1.

In order to protect rolling bearing 2 and slide ring 3 from contamination, a hose-like circumferential dust protection bellows 7, laterally encompassing rolling bearing 2 and slide ring 3, is located around rolling bearing 2 and slide ring 3, thus correspondingly increasing the service life of rolling bearing 2 and slide ring 3. For secure mounting on rolling bearing 2 and slide ring 3, dust protection bellows 7 is equipped at its ends with projections 8 and 9 which engage into recesses 10 and 11 located on outer ring 2*b* of rolling bearing 2 and on slide ring 3.

By way of a corresponding circumferential stress in projections 8 and 9 and recesses 10 and 11, dust protection bellows 7 prevents outer ring 2*b* of rolling bearing 2 from co-rotating.

What is claimed is:

1. A center bearing for a shaft, with a bearing housing for the center bearing, the center bearing comprising:

a rolling bearing arranged on the shaft, the rolling bearing having an outer ring;

a slide ring being arranged over an outer circumference of the outer ring of the rolling bearing, the slide ring being wider in an axial direction than the rolling bearing so as to enable the rolling bearing to be axially displaceable in the slide ring;

a decoupling element being arranged between the slide ring and the bearing housing; and a dust protection bellows for the rolling bearing and the slide ring.

2. The center bearing as recited in claim 1 wherein the decoupling element is immovable with respect to the slide ring and the bearing housing.

3. The center bearing as recited in claim 1 wherein the decoupling element is made of elastomeric material.

4. The center bearing as recited in claim 1 wherein the decoupling element has a variable cross section in a circumferential direction.

5. The center bearing as recited in claim 1 wherein the decoupling element has recesses.

6. The center bearing as recited in claim 1 wherein the rolling bearing is a thin-ring bearing.

7. The center bearing as recited in claim 1 wherein the dust protection bellows includes a first projection at a first end and a second projection at a second end, the first projection engaging a first recess in the outer ring of the rolling bearing, and the second projection engaging a second recess in the slide ring.

8. The center bearing as recited in claim 1 wherein the shaft is a propeller shaft.

9. The center bearing as recited in claim 1 wherein a dimension of the rolling bearing measured in an axial direction is smaller than a dimension of the decoupling element measured in an axial direction.

\* \* \* \* \*